United States Patent [19]
McDowell

[11] Patent Number: 5,990,831
[45] Date of Patent: Nov. 23, 1999

[54] FFT IMPLEMENTATION OF DIGITAL ANTENNA ARRY PROCESSING IN GNSS RECEIVERS

[75] Inventor: Charles E. McDowell, Cedar Rapids, Iowa

[73] Assignee: Rockwell International Corporation, Costa Mesa, Calif.

[21] Appl. No.: 09/139,366

[22] Filed: Aug. 25, 1998

[51] Int. Cl.$^6$ ................................................. G01S 3/16
[52] U.S. Cl. ........................... 342/378; 342/17; 342/196
[58] Field of Search ............................ 342/17, 196, 378, 342/379

[56] References Cited

U.S. PATENT DOCUMENTS

| | | | |
|---|---|---|---|
| 4,641,143 | 2/1987 | Apostolos | 342/445 |
| 4,654,667 | 3/1987 | Apostolos et al. | 342/445 |
| 5,363,111 | 11/1994 | Murphy | 342/383 |

*Primary Examiner*—Mark Hellner
*Attorney, Agent, or Firm*—Kyle Eppele; James P. O'Shaughnessy

[57] ABSTRACT

Disclosed are global navigation satellite system (GNSS) receivers, including digital spatial nulling arrays, and a method of providing antenna pattern outputs using the same. The digital spatial nulling array receives multiple antenna element inputs. A fast Fourier transform (FFT) is applied to the multiple antenna element inputs to obtain frequency domain representations of the multiple antenna element inputs. The antenna pattern outputs are provided by the spatial nulling array as a function of the frequency domain representations of the multiple antenna element inputs.

9 Claims, 7 Drawing Sheets

PRIOR ART Fig. 2

FFT IMPLEMENTATION OF DIGITAL ANTENNA ARRY PROCESSING IN GNSS RECEIVERS

FIELD OF THE INVENTION

The present invention relates to digital antenna array processing circuitry used in global navigation satellite system (GNSS) receivers. More particularly, the present invention relates to digital implementations of spatial nulling arrays which significantly reduce the digital processing required to generate the array output patterns.

BACKGROUND OF THE INVENTION

GNSS receivers, such as global positioning system (GPS) receivers, receive and process multiple satellite positioning signals simultaneously. Frequently, GNSS receivers operate in the presence of interfering or jamming signals. Generally, when a spatial separation exists between the jamming signals and the desired signals, a spatial nulling array can be used to enhance signal reception.

Typically, a very large number of complex multiplies (i.e., multiplication of complex numbers) are required to implement a spatial nulling array. If the antenna array includes Ne antenna element inputs, and a set of weights corresponding to the tap values for one Nt tap finite impulse response (FIR) filter per element, the array will include Nt*Ne total taps per antenna pattern. To generate the output for one antenna pattern, the outputs of the Ne FIR filters corresponding to that one pattern are summed together. To generate one set of output samples for Np patterns, a total of Np*Nt*Ne complex multiplies are required. Consequently, digital implementations of spatial nulling arrays can consume considerable processing power.

SUMMARY OF THE INVENTION

Disclosed are global navigation satellite system (GNSS) receivers, including digital spatial nulling arrays, and a method of providing antenna pattern outputs using the same. The digital spatial nulling array receives multiple antenna element inputs. A fast Fourier transform (FFT) is applied to the multiple antenna element inputs to obtain frequency domain representations of the multiple antenna element inputs. The antenna pattern outputs are provided by the spatial nulling array as a function of the frequency domain representations of the multiple antenna element inputs.

DETAILED DESCRIPTION OF THE PREFERRED EMBODIMENTS

Figure 1:
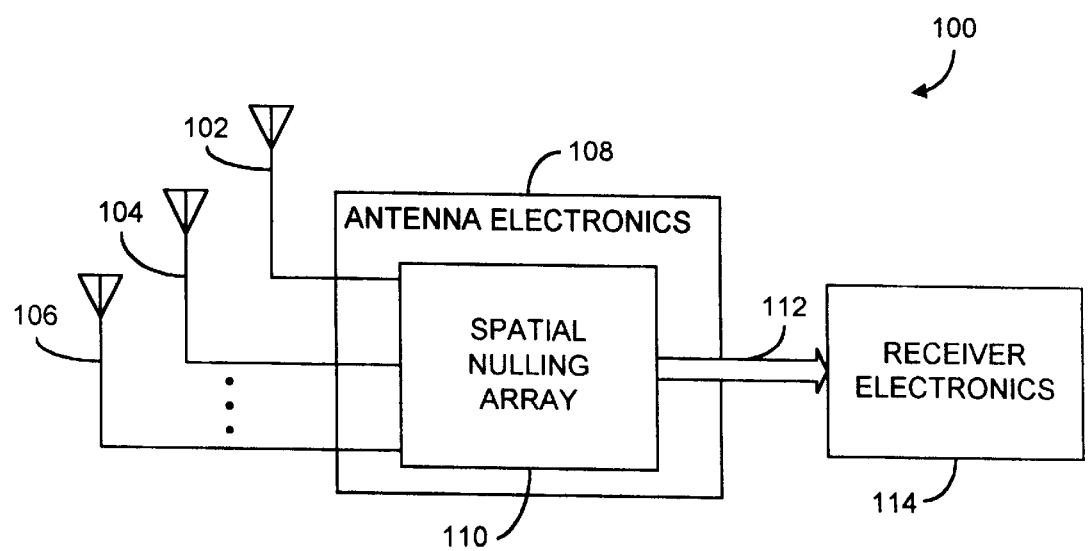
FIG. 1 is a block diagram illustrating antenna electronics of a GPS receiver which includes the spatial nulling array embodiments of the present invention.

FIG. 1 is a block diagram of GNSS receiver 100 in accordance with embodiments of the present invention. Receiver 100 includes an array of Ne antenna elements (only antenna elements 102, 104 and 106 are shown) providing Ne inputs to spatial nulling array 110 of antenna electronics 108. Spatial nulling array 110 provides Np antenna pattern outputs 112 to receiver electronics 114 of receiver 100. Receiver 100 utilizes the information contained in the Np antenna pattern outputs or signals to determine a navigation solution.

Figure 2:
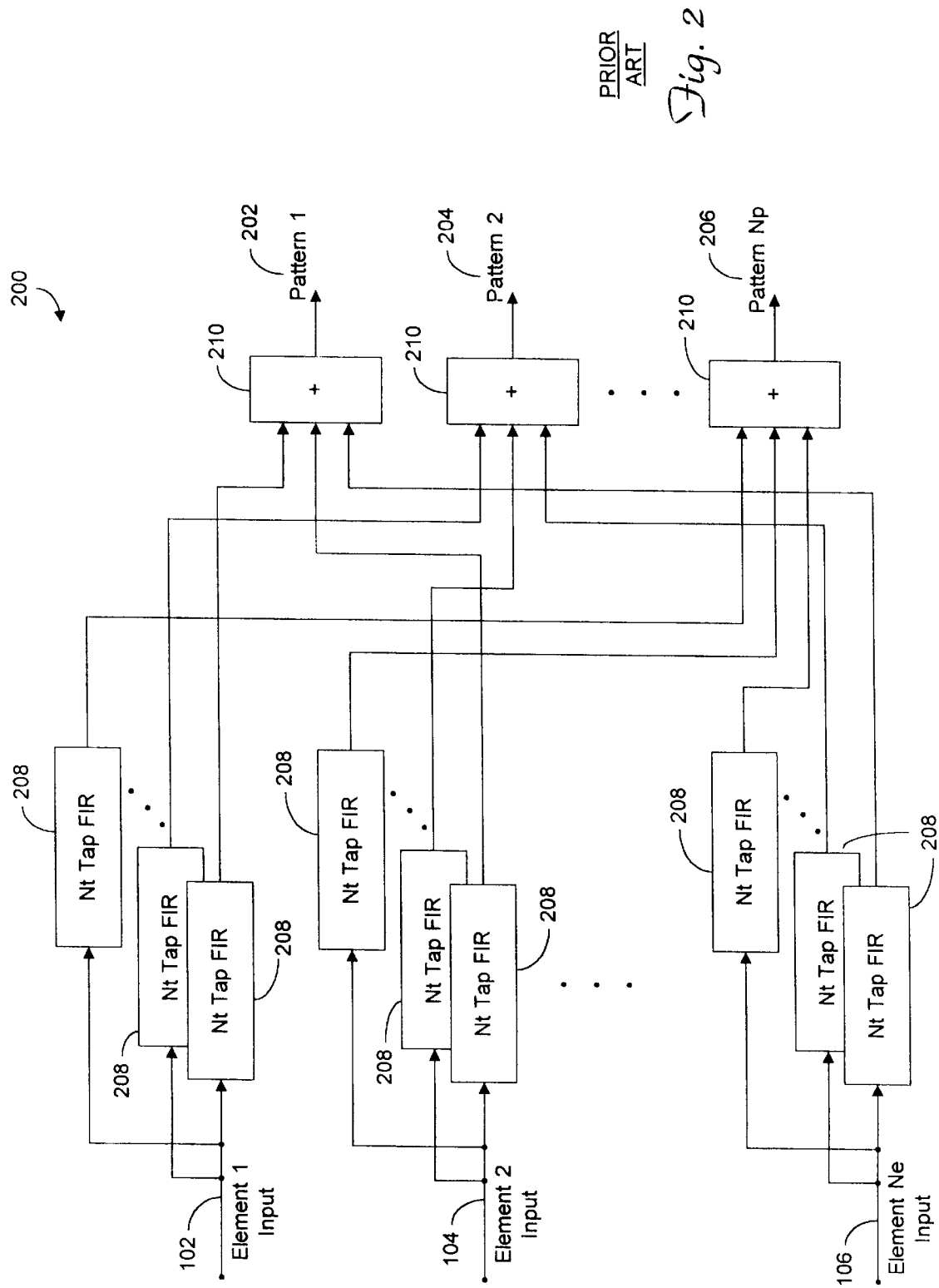
FIG. 2 is a block diagram illustrating a prior art digital implementation of a spatial nulling array.

The present invention improves upon digital implementations of spatial nulling arrays, significantly reducing the amount of digital processing required to generate the antenna pattern outputs. FIG. 2 shows a generalized digital processing section of a prior art array 200 using a conventional approach. At the left are the Ne complex digital inputs 102, 104 and 106, one for each element in the array. For each of Np antenna patterns to be generated (only antenna patterns 202, 204 and 206 are shown), there is one set of weights. A set of weights corresponds to the tap values for one Nt tap FIR filter 208 per element. Therefore, there are Nt*Ne total taps per antenna pattern. To generate the output for one antenna pattern, the outputs of the Ne FIR filters 208 corresponding to that pattern are summed together at summing nodes 210. Therefore, each pattern requires Nt*Ne complex multiplies per output sample. To generate one set of output samples for Np patterns, Np*Nt*Ne complex multiplies are required. The present invention reduces the total number of complex multiples, and thus the digital processing complexity.

Figure 3:
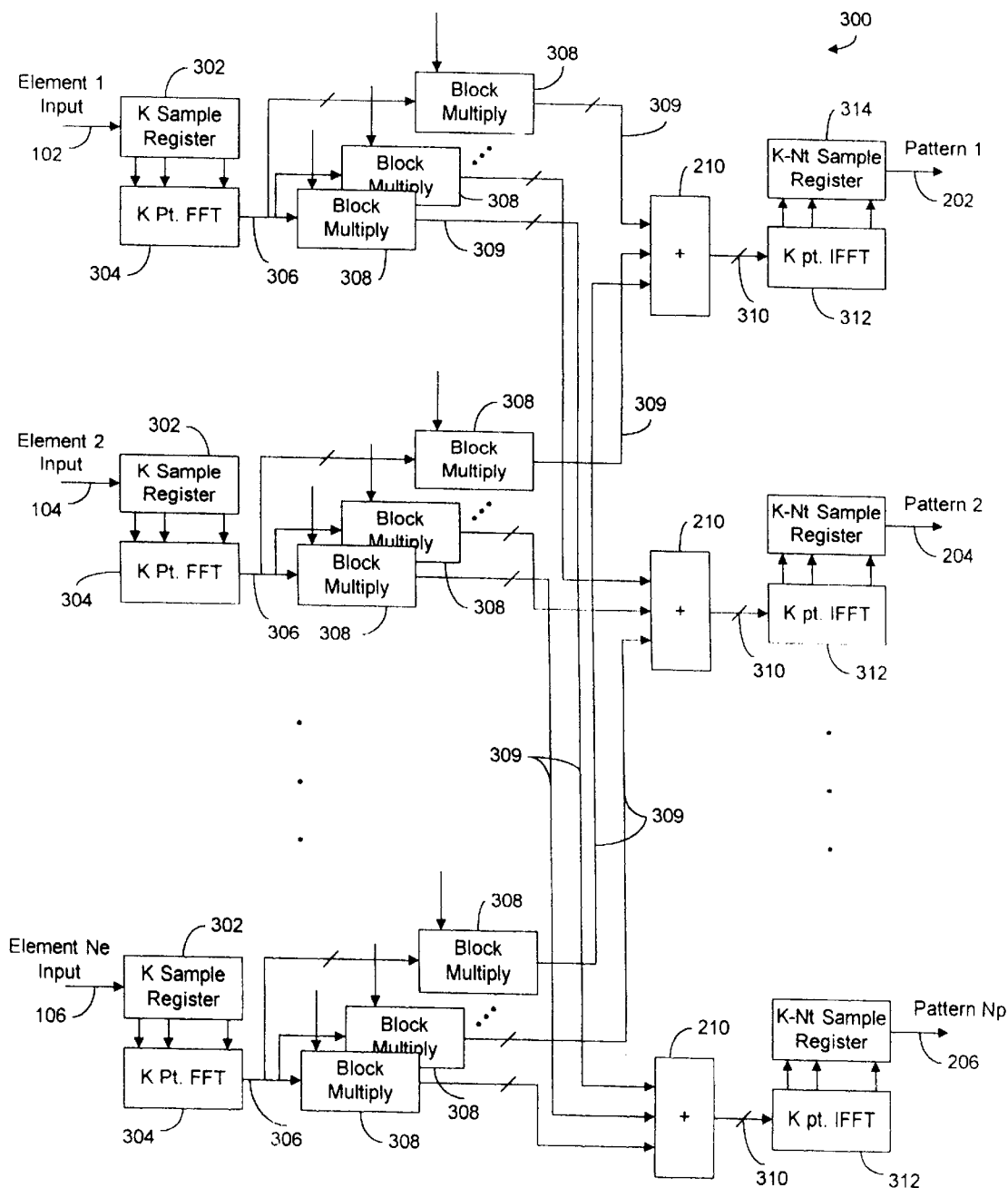
FIG. 3 is a block diagram illustrating an overlap save fast Fourier transform (FFT) implementation of a digital spatial nulling array in accordance with a first embodiment of the present invention.

The present invention utilizes FFT processing to implement the weighting functions in the spatial nulling array, as opposed to using direct convolution as used in the prior art spatial nulling array shown in FIG. 2. An embodiment of the present invention is illustrated in FIG. 3. Spatial nulling array 300 illustrated in FIG. 3 is a first possible embodiment of spatial nulling array 110, and includes K-sample registers 302, K-point FFT devices 304, block multipliers 308, summing nodes or devices 210, K-point inverse FFT (IFFT) devices 312, and K–Nt point sample registers 314. As shown, in spatial nulling array 300, each of the Ne complex digital inputs 102, 104 and 106 is read into one of K-sample registers 302 in order to convert the inputs from single sample points to blocks. The block size K is selected to minimize the computations per sample, and should be convenient for the FFT device. Therefore, block sample size K will preferably be a power of two.

For each of the Np patterns 202, 204 and 206 to be generated, the blocks of data stored in registers 302 are transformed into the frequency domain using K-point FFT devices 304. Then, the outputs 306 from the FFT devices 304 are multiplied pointwise, in block multipliers 308, by the K point FFTs of the FIR filter taps from the implementation illustrated in FIG. 2. In other words, the outputs 306 of FFT devices 304 are multiplied by the FFTs of the weights implemented by filters 208 illustrated in FIG. 2.

The outputs 309 of each of block multiplier 308 for a given pattern are then added together pointwise at summation devices 210. Next, the summed values 310 are converted back into the time domain using IFFT devices 312. K–Nt useful data points are provided by IFFT devices 312, and these useful data points are read back into K–Nt sample registers 314 and re-serialized. The re-serialized outputs are provided as antenna pattern outputs 202, 204 and 206. While spatial nulling array 300 is shown as an "overlap save" FFT implementation, other implementations such as an "overlap-add" implementation, can be used as well.

There are several reasons why the approach of the present invention is more effective for array processing than for an FIR filter alone. First of all, when multiple patterns are being generated, only a single FFT device is needed at the element input, which can be utilized by all of the patterns. Second, the outputs 309 of block multiply devices 308 can be added while still in the frequency domain, so only one IFFT is required for each pattern. Even if only one pattern is being generated, savings will be realized with fewer taps (Nt) than would be expected for a single Nt tap FIR filter by itself.

An N-point FFT requires roughly $(N/2)\log_2 N$ or less complex multiplies. Using a block size of K, there are $Ne*((K/2)\log_2 K)$ multiplies at the input, $K*Np*Ne$ multiplies in the block (pointwise) multipliers 308, and $Np*((K/2\log_2 K)$ multiplies at the output of IFFT devices 312. When one block is processed, K–Nt useful samples are generated (per pattern). Therefore, the number of complex multiplies per output sample is determined using Equation 1:

$$\frac{((K/2)\log_2 K)*(Ne+Np)+(K*Np*Ne)}{K-Nt} \qquad \text{Equation 1}$$

Since the direct method requires $Nt*Np*Ne$ complex multiplies per output, the methods of the present invention greatly reduce processing complexity.

Figure 4:
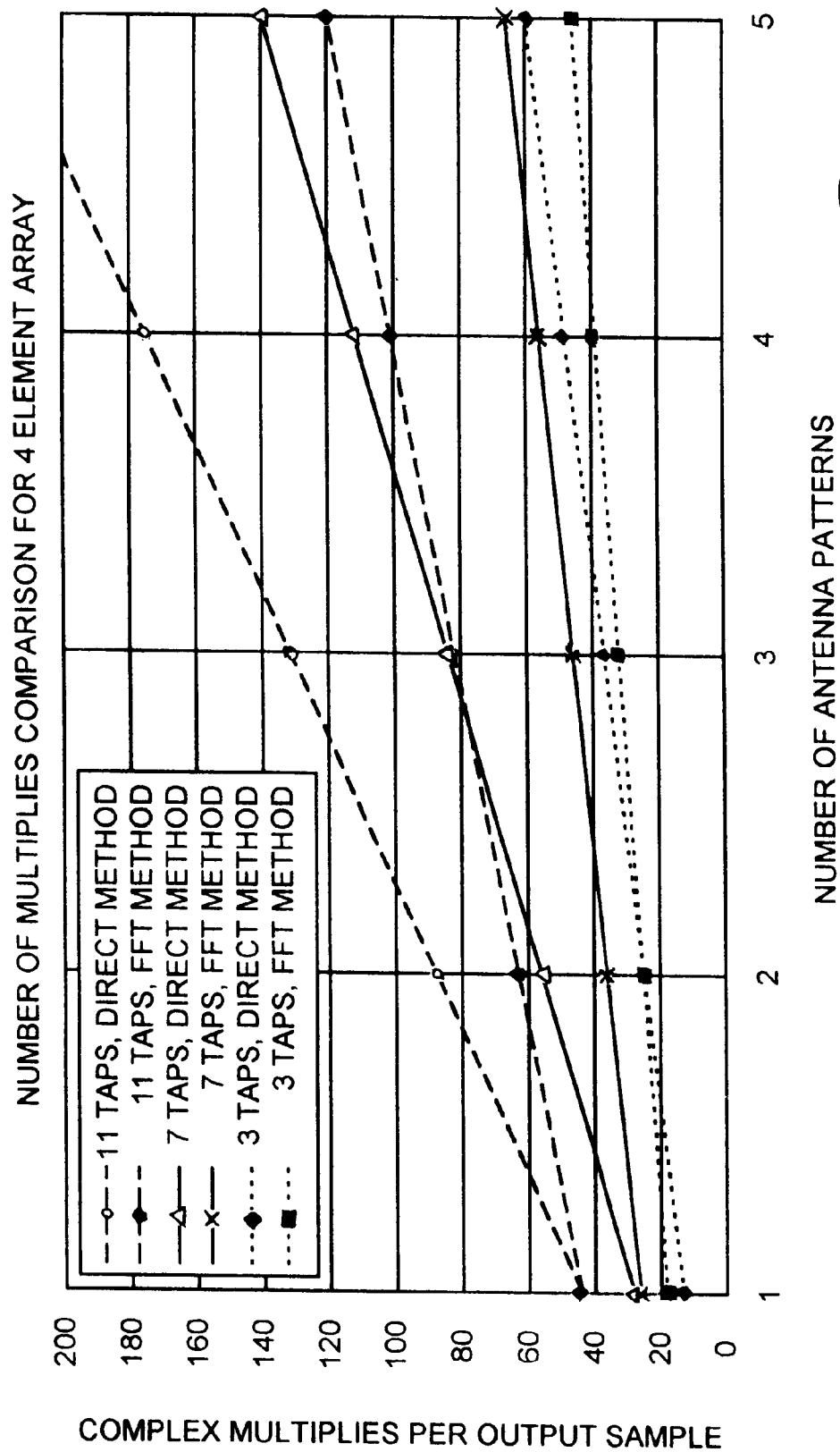
FIGS. 4, 5 and 6 are plots, illustrating the number of complex multiplies required to implement various digital spatial nulling arrays, which demonstrate the reduced processing achieved by the present invention.
Figure 5:
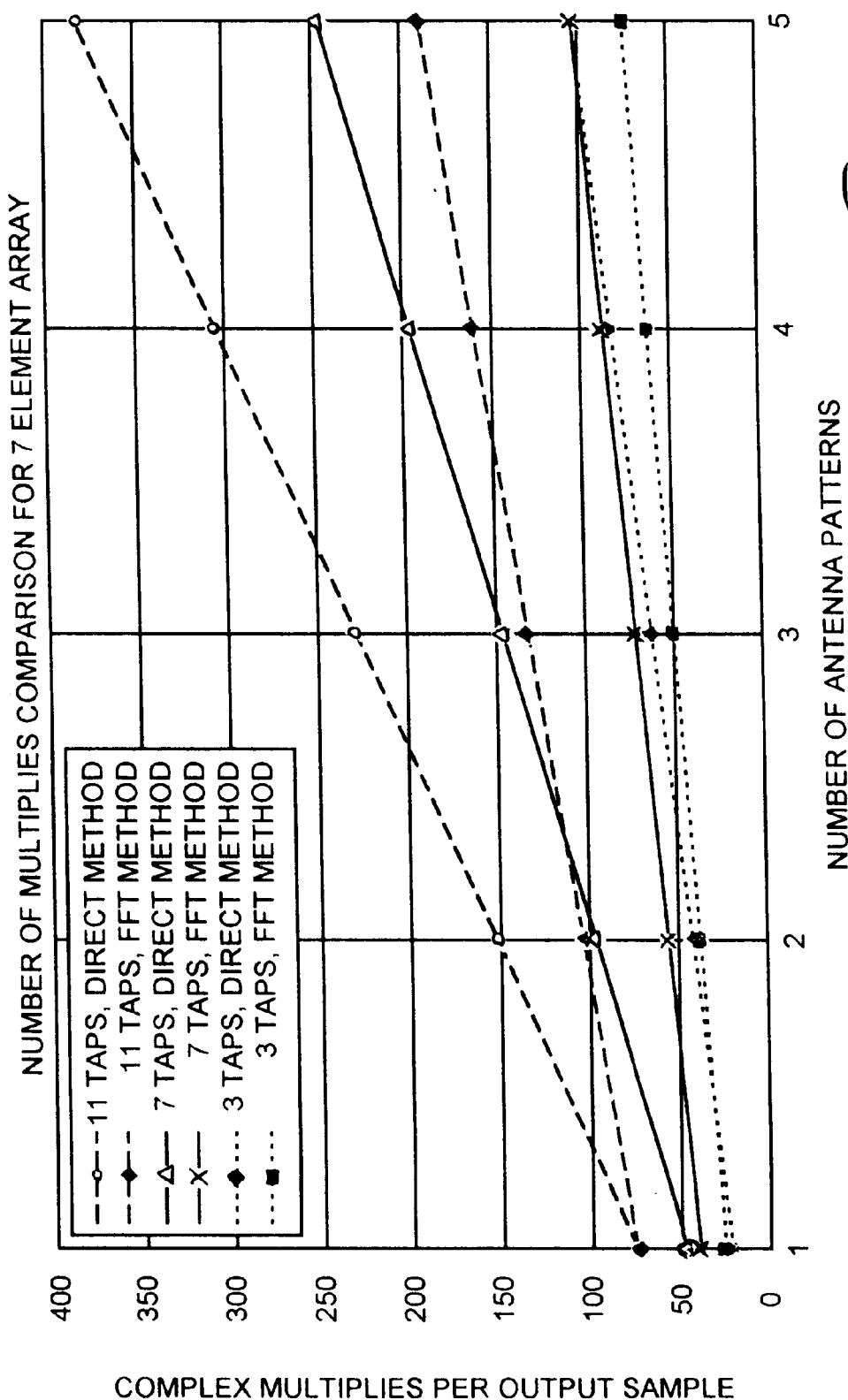
Figure 6:
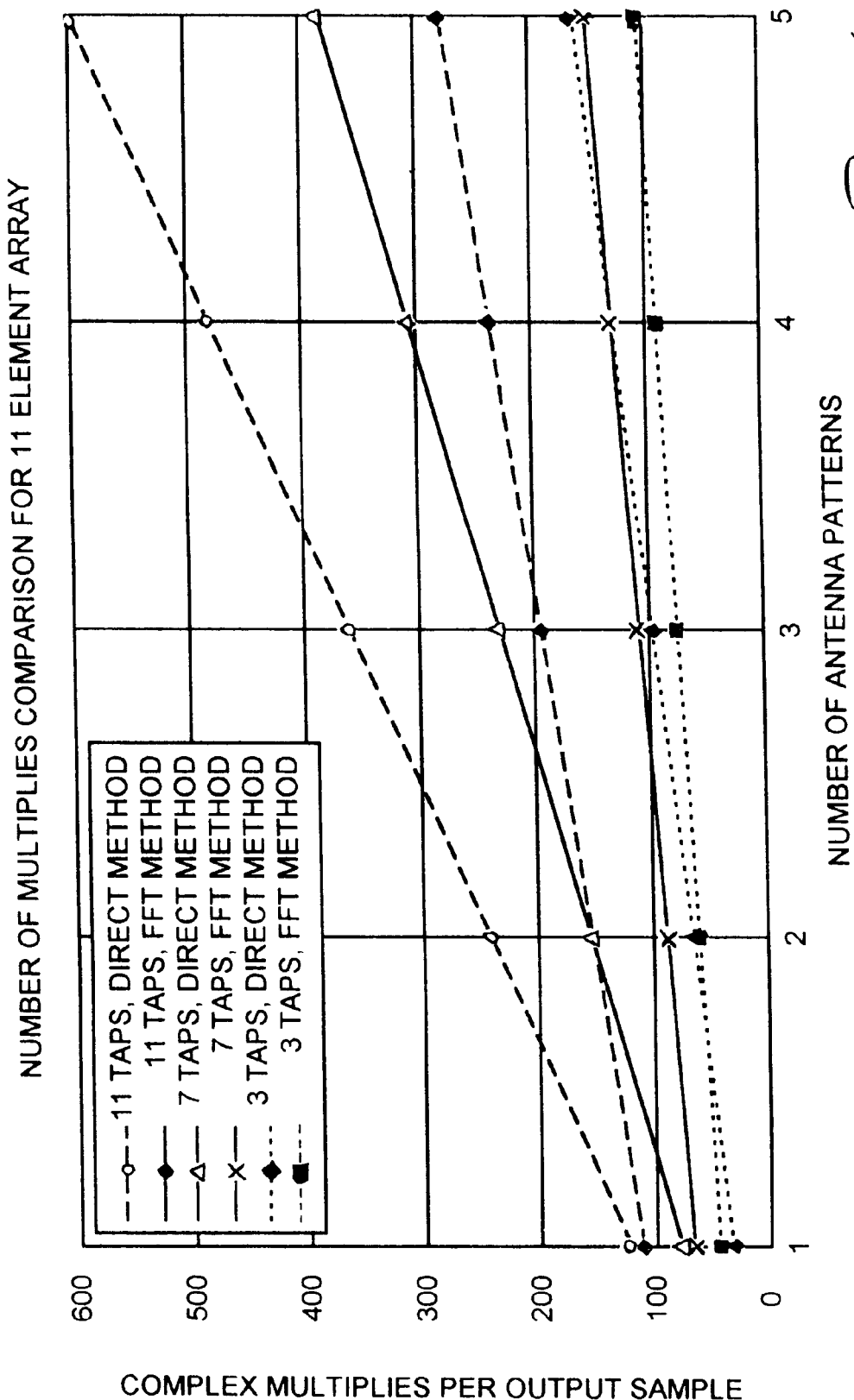

FIGS. 4, 5 and 6 illustrate comparisons of the number of multiplies required for various combinations of parameters in 4, 7 and 11 element arrays, respectively. The K value in the plots was selected as the optimal value that was still a power of 2. As can be seen in FIGS. 4, 5 and 6, the FFT digital nulling antenna array processing of the present invention greatly reduces the number of complex multiplies required, as compared to the prior art.

Figure 7:
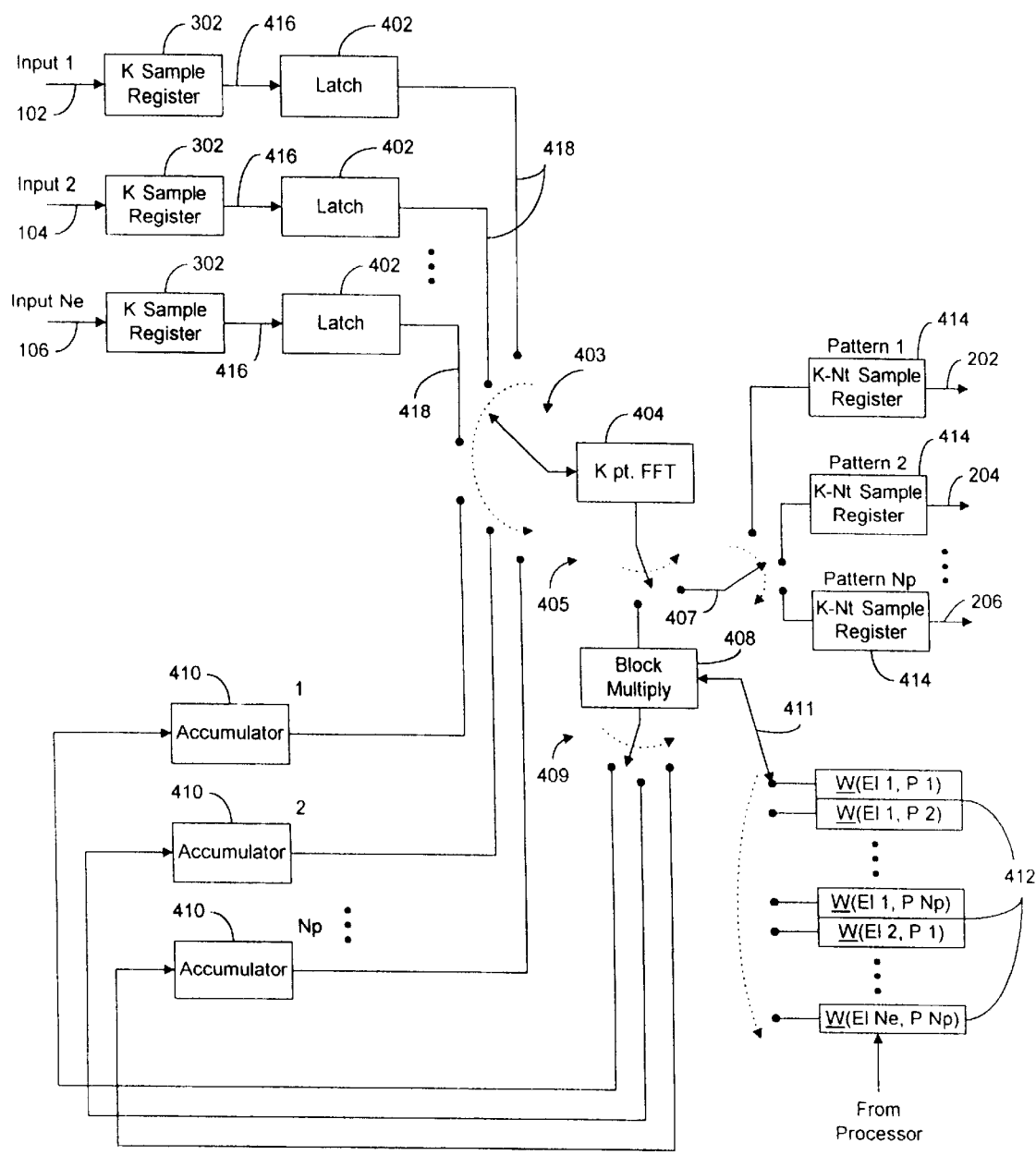
FIG. 7 is a block diagram of an FFT implementation of a digital spatial nulling array which reduces hardware in accordance with an embodiment of the present invention.

While the FFT spatial nulling array implementation shown in FIG. 3 reduces the number of complex multiplies per output sample, it can potentially increase the required amount of hardware in terms of the number of gates. This results from the fact that the rate of the block processing can be much slower than the rate of the direct approach (reduced by roughly the block size). In order to realize a reduction in the amount of hardware, the processing can be pipelined and the clock rate put back to the rate used in the conventional non-FFT approach. FIG. 7 shows one method of implementing this hardware reducing concept.

Digital spatial nulling array circuit 400 illustrated in FIG. 7 is one possible hardware reducing implementation of spatial nulling array 110. Circuit 400 includes K-sample registers 302, latches 402, a single FFT block device 404, a single block multiplier device 408, accumulators 410, weight generators 412, and K–Nt sample registers 414. Circuit 400 operates generally as follows.

In circuit 400, each of the Ne complex digital inputs 102, 104 and 106 is read into one of K-sample registers 302 in order to convert the inputs from single sample points to blocks. The blocks of data 416 are temporarily stored in latch devices 402. The values stored in latch devices 402 are provided at latch outputs 418. Switch 403 is used to connect outputs 418 of latch devices 402 to K-point FFT device 404 one at a time. The input to FFT device 404 is successively coupled to the output of each latch device 402 long enough for block multiplier device 408 to multiply the FFT output by the corresponding weight set from weight generators 412, and to apply the multiplied outputs to a corresponding accumulator 410 which keeps a running sum. Therefore, while switch 403 connects the input of FFT device 404 to each of latch outputs 418, switch 405 maintains the output of FFT device 404 coupled to block multiplier device 408. At the same time, switch 411 successively couples the appropriate sets of weights for each input to block multiplier 408 while switch 409 successively couples the output of block multiplier 408 to the appropriate accumulator. After switch 403 couples one of latch outputs 418 (corresponding to an antenna element input) long enough for the multiplier block to multiply the FFT output by each of the weight sets and to apply the output to the appropriate accumulator, switch 403 proceeds to connect the next latch output to the FFT device.

Once all of the elements have been utilized, the output of FFT device 404 is successively coupled via switch 407 to the output paths provided by K–Nt sample registers 414. FFT device 404 is then controlled to place it in an IFFT mode. At this point, switch 403 successively couples each of accumulators 410 (a K-length block) through the IFFT. The output of each IFFT is placed in the appropriate output register 414, thus providing antenna pattern outputs 202, 204 and 206, while realizing a significant reduction in hardware.

Although the present invention has been described with reference to preferred embodiments, workers skilled in the art will recognize that changes may be made in form and detail without departing from the spirit and scope of the invention.

What is claimed is:

1. A global satellite navigation system (GNSS) receiver comprising:
   a plurality of antenna elements providing a plurality of antenna element inputs; and
   a digital spatial nulling array coupled to the plurality of antenna elements and receiving the plurality of antenna element inputs, the digital spatial nulling array adapted to apply a fast Fourier transform (FFT) to the plurality of antenna element inputs to obtain frequency domain representations of the plurality of antenna element inputs, adapted to implement an array weighting function on the frequency domain representations of the plurality of antenna element inputs, and adapted to provide a plurality of antenna pattern outputs as a function of the frequency domain representations of the plurality of antenna element inputs.

2. The GNSS receiver of claim 1, wherein the digital spatial nulling array is adapted to implement the array weighting function by multiplying the frequency domain representations of the plurality of antenna element inputs by frequency domain representations of finite impulse response (FIR) filter weights.

3. The GNSS receiver of claim 1, wherein the digital spatial nulling array further comprises:
   a plurality of K-sample registers each adapted to store K blocks of a corresponding one of the plurality of antenna element inputs; and
   a K-point FFT device coupled to each K-sample register and adapted to convert the K blocks of the corresponding one of the plurality of antenna element inputs into the frequency domain representation of the antenna element input.

4. The GNSS receiver of claim 3, wherein the digital spatial nulling array further comprises a block multiplier device receiving the frequency domain representations of the plurality of antenna element inputs, the block multiplier device implementing an array weighting function on the frequency domain representations of the plurality of antenna element inputs by multiplying the frequency domain representations of the plurality of antenna element inputs by a plurality of sets of weights corresponding to the plurality of antenna pattern outputs.

5. The GNSS receiver of claim 4, wherein the digital spatial nulling array further comprises a plurality of summers, wherein each of the plurality of summers sums a different combination of multiplied frequency domain representations of the plurality of antenna element inputs to provide the plurality of antenna pattern outputs.

6. A method of providing a plurality of antenna pattern outputs using a digital spatial nulling array, the method comprising:

receiving a plurality of antenna element inputs;

applying a fast Fourier transform (FFT) to the plurality of antenna element inputs to obtain frequency domain representations of the plurality of antenna element inputs; and providing a plurality of antenna pattern outputs as a function of the frequency domain representations of the plurality of antenna element inputs, wherein providing the plurality of antenna pattern outputs further comprises implementing an array weighting function on the frequency domain representations of the plurality of antenna element inputs.

7. The method of claim 6, wherein implementing the array weighting function on the frequency domain representations of the plurality of antenna element inputs further comprises multiplying the frequency domain representations of the plurality of antenna element inputs by frequency domain representations of filter weights to obtain weighted frequency domain representations of the plurality of antenna element inputs.

8. The method of claim 7, wherein providing the plurality of antenna pattern outputs as a function of the frequency domain representations of the plurality of antenna element inputs further comprises summing combinations of the weighted frequency domain representations of the plurality of antenna element inputs.

9. The method of claim 8, wherein providing the plurality of antenna pattern outputs as a function of the frequency domain representations of the plurality of antenna element inputs further comprises converting the summed combinations of the weighted frequency domain representations of the plurality of antenna element inputs into time domain antenna pattern outputs.

* * * * *